(12) United States Patent
Jounay et al.

(10) Patent No.: US 8,130,775 B2
(45) Date of Patent: Mar. 6, 2012

(54) MECHANISM FOR PROTECTING A PSEUDO-WIRE

(75) Inventors: Frederic Jounay, Pleumeur Bodou (FR); Philippe Niger, Lannion (FR); Arnaud Cauvin, Paris (FR)

(73) Assignee: France Telecom, Paris (FR)

( * ) Notice: Subject to any disclaimer, the term of this patent is extended or adjusted under 35 U.S.C. 154(b) by 141 days.

(21) Appl. No.: 12/528,083

(22) PCT Filed: Feb. 26, 2008

(86) PCT No.: PCT/FR2008/050324
§ 371 (c)(1),
(2), (4) Date: Nov. 25, 2009

(87) PCT Pub. No.: WO2008/110735
PCT Pub. Date: Sep. 18, 2008

(65) Prior Publication Data
US 2010/0098094 A1    Apr. 22, 2010

(30) Foreign Application Priority Data
Feb. 26, 2007  (FR) ...................... 07 53489

(51) Int. Cl.
*H04L 12/28* (2006.01)

(52) U.S. Cl. .................... 370/401; 710/316; 379/242

(58) Field of Classification Search .................. 370/401, 370/228, 389; 709/238
See application file for complete search history.

(56) References Cited

U.S. PATENT DOCUMENTS

| | | | |
|---|---|---|---|
| 2007/0239891 A1* | 10/2007 | Wainner et al. | 709/238 |
| 2008/0089227 A1* | 4/2008 | Guichard et al. | 370/228 |
| 2008/0175234 A1* | 7/2008 | Li | 370/389 |

OTHER PUBLICATIONS

P. Pan (Hammerhead Systems); M. Bocci, and M. Aissaoui (Alcatel); F. Blaus and H. Ould-Brahim (Nortel), "Pseudo Wire Protection" IETF Standard-Working-Draft, Internet Engineering Task Force, IETF, Chapter No. 3, Jul. 1, 2006.
M. Bocci (Alcatel); S. Bryant (Cisco Systems), "An Architecture for Multi-Segment Pseudo Wire Emulation Edge-to-Edge" IETF Standard-Working-Draft, Internet Engineering Task Force, IETF, vol. pwe3, No. 2, Oct. 20, 2006.
E. Mannie, D. Papadimitriou: "Recovery (Protection and Restoration) Terminology for Generalized Multi-Protocol Label Switching (GMPLS)" IETF Standard-Working-Draft, Internet Engineering Task Force, IETF, Oct. 5, 2004. L. Martini (Cisco Systems Inc); M. Bocci and F. Balus (Alcatel): "Dynamic Placement of Multi Segment Pseudo Wires" IETF Standard-Working-Draft, Internet Engineering Task Force, IETF, CH, vol. pwe3, No., Oct. 2, 2006.
International Search Report for corresponding International Application No. PCT/FR2008/050324, filed Feb. 26, 2008.

* cited by examiner

*Primary Examiner* — Robert Wilson
*Assistant Examiner* — Lionel Preval
(74) *Attorney, Agent, or Firm* — David D. Brush; Westman, Champlin & Kelly, P.A.

(57) ABSTRACT

A method is provided for setting up at least two pseudo-wires able to broadcast a stream of data, wherein a first pseudo-wire is set up between an input router of a packet-switched network and first output router of the packet-switched network, and a second pseudo-wire is set up between the input router and a second output router of the packet-switched network. A first link of the first pseudo-wire is set up between the first output router and an intermediate router of the packet-switched network. A second link of the second pseudo-wire is set up between the second output router and the intermediate router. A third link of both pseudo-wires is set up between the intermediate router and the input router.

9 Claims, 6 Drawing Sheets

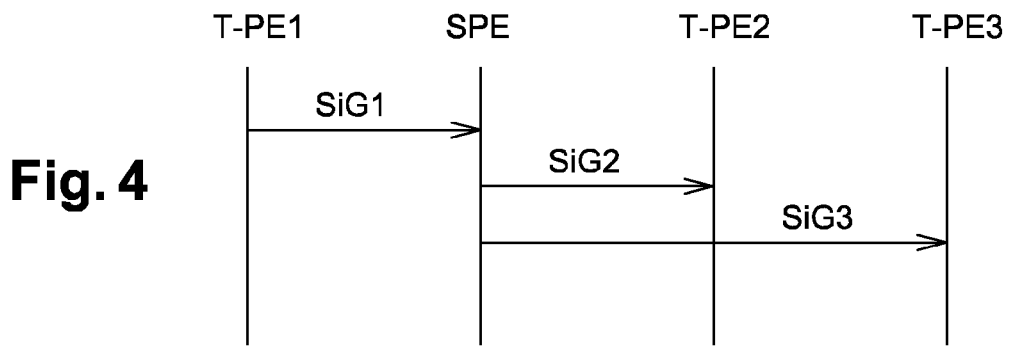
Fig. 4
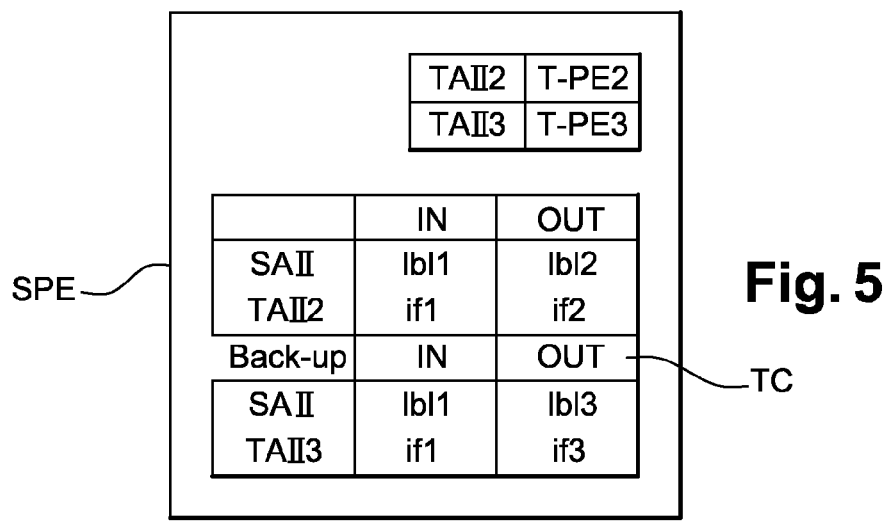
Fig. 5
| SAⅡ / IFE | TAⅡ2 / IFS2 | lbl1 | TAⅡ3 / IFS3 | Back-up |
Fig. 6A
| SAⅡ / IFE | TAⅡ2 / IFS2 | lbl2 |
Fig. 6B
| SAⅡ / IFE | TAⅡ3 / IFS3 | lbl3 |
Fig. 6C

| SAII / IFe | TAII2 / IFS2 | lbl10 | TAII3 / IFS3 | Back-up | IdS-PE4 |

| SAII / IFe | TAII2 / IFS2 | lbl12 |

| SAII / IFe | TAII3 / IFS3 | lbl13 |

MECHANISM FOR PROTECTING A PSEUDO-WIRE

CROSS-REFERENCE TO RELATED APPLICATIONS

This Application is a Section 371 National Stage Application of International Application No. PCT/FR2008/050324, filed Feb. 26, 2008 and published as WO 2008/110735 on Sep. 18, 2008, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is telecommunications, and more particularly packet-switched networks.

BACKGROUND OF THE DISCLOSURE

In a packet-switched network, data is transmitted in the form of packets processed by routers of the network until they reach their destination. Together the packets for transmission constitute a data stream.

One example of a technology used for routing data packets in packet-switched networks is the multi-protocol label switching (MPLS) technology. The MPLS technology adds one or more labels to the data packet headers, said labels containing information enabling the routers of the network to determine the next hop for a packet to reach its destination. The MPLS technology is described in more detail in Internet Engineering Task Force (IETF) Request For Comments (RFC) 3031.

However, the MPLS protocol can process only packets conforming to the Internet Protocol (IP).

To alleviate this problem, the IETF Pseudo-Wire Emulation Edge-To-Edge (PWE3) standardization group has defined a pseudo-wire concept for emulating a point-to-point link between two equipments of a packet-switched network based on the IP/MPLS technology. Such pseudo-wires, defined in the document RFC 3985, enable data packets to be transmitted that do not conform to the Internet Protocol, for example data packets conforming to the ATM protocol.

Referring to FIG. 1, a pseudo-wire pw1 is set up between a first router T-PE1 at the edge of a packet-switched network PSN and a second router T-PE2, also at the edge of the network PSN. A first link L1 that is part of the pseudo-wire pw1 is set up between the first router T-PE1 and an intermediate router S-PE of the network PSN. A second link L2 that is also part of the pseudo-wire pw1 is set up between the intermediate router S-PE and the second router T-PE2. The first router T-PE1 is called the input router and constitutes a first end of the pseudo-wire pw1 and the second router T-PE2 is called the output router and constitutes a second end of the pseudo-wire pw1. Once the pseudo-wire pw1 has been set up, the input router T-PE1 transmits a data stream routed via the pseudo-wire pw1 to the output router T-PE2. This kind of pseudo-wire pw1 is defined in more detail in the document "An Architecture for Multi-Segment Pseudo-Wire Emulation Edge-to-Edge" (draft-ietf-pwe3-ms-pw-arch-02.txt).

To ensure continuity of service in the event of a fault affecting the output router, the working group PWE3 proposes a solution that backs up the first pseudo-wire set up between the input router and the output router by a second pseudo-wire serving as a back-up pseudo-wire so that, in the event of a fault affecting the output router constituting one end of the first pseudo-wire, the data packets are routed by the back-up pseudo-wire, one end of which consists of a different output router.

Accordingly, referring to FIG. 2, a first pseudo-wire pw1 is set up between an input router T-PE1 at the edge of a packet-switched network PSN and an output router T-PE2 also at the edge of the network PSN. A first link L1 that is part of the pseudo-wire pw1 is set up between the input router T-PE1 and an intermediate router S-PE of the network PSN. A second link L2 that is also part of the pseudo-wire pw1 is set up between the intermediate router S-PE and the output router T-PE2. A second pseudo-wire pw2 is then set up between the input router T-PE1 constituting a first end of the pseudo-wire and a second output router T-PE3 constituting a second end of the pseudo-wire. A first link L3 that is part of the second pseudo-wire is set up between the input router T-PE1 and the intermediate router S-PE and a second link L4 that is also part of the second pseudo-wire is set up between the intermediate router S-PE and the second output router T-PE3.

To ensure continuity of service, the input router T-PE1 includes a function for detecting a fault affecting the first output router T-PE2 and a function for switching the data stream from the first pseudo-wire pw1 to the second pseudo-wire pw2.

A fault affecting the first output router T-PE2 is detected in the input router T-PE1, for example from a message indicating the occurrence of a fault sent via the public switched network PSN to the input router T-PE1. Once informed of the fault, the input router T-PE1 triggers switching of the data stream from the first pseudo-wire pw1 to the second pseudo-wire pw2, thus routing the data to the output router T-PE3.

However, this kind of solution has the drawback of consuming network resources, for example processing resources in the network equipments (storage capacity, computation capacity, etc.), signaling streams for setting-up two pseudo-wires, and bandwidth, especially between the input router and the intermediate router. This increases the restore time in the event of a fault affecting an output router, with a negative impact on quality of service.

SUMMARY

The solution proposed in the context of an exemplary embodiment of the invention is free of those problems of the prior art.

An embodiment is based on a method of setting up at least two pseudo-wires able to broadcast a data stream wherein a first pseudo-wire is set up between an input router of a packet-switched network and a first output router of said packet-switched network, the second pseudo-wire is set up between said input router and a second output router of said packet-switched network, a first link that is part of the first pseudo-wire is set up between the first output router and an intermediate router of said packet-switched network, and a second link that is part of the second pseudo-wire is set up between said second output router and said intermediate router.

This kind of setting up method is noteworthy in that a third link that is part of the two pseudo-wires is set up between said intermediate router and said input router.

This optimizes the use of network resources, for example bandwidth, between the input router and the intermediate router by setting up between them a single link common to the two pseudo-wires. This solution has never been envisaged in the prior art. In the prior art, when a main pseudo-wire and a back-up pseudo-wire are set up between an input router and a first, respectively a second, output router, a link is set up between the input router and the intermediate router for each pseudo-wire, i.e. two links. The person skilled in the art has always considered a pseudo-wire as a point-to-point link set up between an input router and an output router, with the result that each input router/output router pair is associated with a pseudo-wire. Moreover, this kind of approach is recommended in the standards.

Going against this received wisdom of the person skilled in the art, the inventors of the present application propose, in contrast, to share the link set up between the input router and the intermediate router, which improves the use of network resources and reduces the restore time in the event of a fault affecting the first output router. In the prior art, the back-up pseudo-wire, although used only to broadcast data in the event of a fault affecting the main pseudo-wire, reserves resources used to set it up over the whole of the network between the input router and the output router. Because the main pseudo-wire and the back-up pseudo-wire share the link set up between the input router and the intermediate router, the network resources that in the past were reserved for the back-up pseudo-wire are released and can be used in a manner closer to the optimum.

In this kind of embodiment, the first, second, and third links are not necessarily direct links between routers. For example, the second link set up between the intermediate router and the first output router can comprise one or more hops and possibly pass through one or more other intermediate routers before reaching the output router. The same applies to the link set up between the input router and the intermediate router and to the link set up between the intermediate router and the second output router.

The data broadcast on the pseudo-wires can be payload data, for example an ATM stream transporting a service, or service data, for example a message indicating detection of a fault affecting a network equipment. Accordingly, in the situation of exchanging service data, the solution proposed in the present application makes the network equipments more responsive.

According to one feature of the method of an embodiment of the invention, the pseudo-wires are set up at the initiative of said input router by sending said intermediate router a message for setting-up said third link including an identifier of said input router, an identifier of said first output router, and a field containing an identifier of said second output router and a parameter specifying that the second pseudo-wire is a back-up pseudo-wire In this kind of embodiment, setting up the pseudo-wires is at the initiative of the input router. It is assumed, in the context of an embodiment of the invention, that in order to be able to initiate the setting up of the main and back-up pseudo-wires the input router has in a routing table information on the hops to reach the first and second output routers. By means of this information, the input router knows to which router of the network it must send the pseudo-wire set-up message, which router is then considered the intermediate router. It is then necessary to configure only the input router, which reduces network maintenance. The parameter in the set-up message indicating that the second pseudo-wire is a back-up pseudo-wire enables the intermediate router to be configured for subsequent broadcasting of data.

An embodiment of the invention also relates to a method of broadcasting data streams between an input router of a packet-switched network and a first output router of said packet-switched network, wherein a data stream is broadcast on a first pseudo-wire comprising a first link set up between said input router and an intermediate router of said packet-switched network and a second link set up between said intermediate router and said first output router, said method including a step of detecting a fault affecting said first output router.

Moreover, a method of this kind includes a step, on reception by the intermediate router of information relating to a fault, of switching the data stream to a third link set up between said intermediate router and a second output router, said first link and said third link constituting a second pseudo-wire.

An embodiment of this kind improves the restore time in the event of a fault affecting the first output router because the data stream is switched as close as possible to the fault.

An embodiment of the invention further comprises a router adapted to be connected by a first link to an input router of a packet-switched network and by a second link to a first output router of said packet-switched network, said first and second links constituting a first pseudo-wire able to broadcast a data stream, the router being characterized in that it includes:

means for receiving a first message for setting up the first link including an identifier of said input router, an identifier of said first output router, and a field containing an identifier of a second output router of said network;

means for sending a second message for setting up said second link between said router and said first output router and a third message for setting up a third link between said router and said second output router, the second message including the identifier of said input router and the identifier of said first output router, the third message including the identifier of said input router and the identifier of said second output router, and said first and third links constituting a second pseudo-wire;

means for configuring at least one switching table for said broadcasting with a parameter specifying that the second pseudo-wire is a back-up pseudo-wire, said parameter being included in the first set-up message.

This kind of intermediate router is able, on reception of a set-up message sent by the input router, to set up two pseudo-wires having a shared link between the input router and the output router and then its own link between the intermediate router and a first, respectively a second, output router. This optimizes use of the resources of the network between the first router and the intermediate router, which improves the restore time on detection of a fault affecting the first output router.

According to another feature, the router of an embodiment of the invention includes means for detecting a fault affecting said first output router and means for switching the data stream from the second link to the third link.

Providing in the intermediate router a function for detecting a fault affecting the first output router and a function for switching the data stream improves the restore time on detection of a fault affecting the first output router.

This improves the responsiveness of the network because detection occurs as close as possible to the fault. Accordingly, a fault affecting the first output router is detected more quickly, as the information does not have to cross the network as far as the input router before being processed. The function for switching the data stream also being a function of the intermediate router, switching the data stream to the third link, set up between the intermediate router and the second output router and with the first link constituting the back-up pseudo-wire, occurs faster because it is triggered on detection of the fault by the intermediate router.

This kind of solution reduces the quantity of data lost following a fault affecting the first output router.

An embodiment of the invention relates to a computer program product downloadable from a communications network and/or stored on a computer-readable medium and/or executable by a processor, characterized in that it comprises program code instructions for implementing the setting-up method of an embodiment of the invention when said program is executed by a computer.

An embodiment of the invention relates to a second computer program product downloadable from a communications network and/or stored on a computer-readable medium and/or executable by a processor, characterized in that it comprises program code instructions for implementing the broadcasting method of an embodiment of the invention when said program is executed by a computer.

An embodiment of the invention relates finally to a signal adapted to be transmitted between an input router of a packet-switched network and an intermediate router of said packet-switched network, said signal carrying a message for setting up at least two pseudo-wires able to broadcast a stream of data, the first pseudo-wire being set up between said input router and a first output router of said packet-switched network, the second pseudo-wire being set up between said input router and a second output router of said packet-switched network, said set-up message including:
- an identifier of said input router;
- an identifier of said first output router;
- a field containing an identifier of said second output router and a parameter specifying that the second pseudo-wire is a back-up pseudo-wire.

BRIEF DESCRIPTION OF THE DRAWINGS

Other features and advantages become apparent on reading the description of preferred embodiments given with reference to the drawings, in which:

FIG. 4 is a timing diagram of the exchange of requests firstly between an input router and an intermediate router of a packet-switched network and secondly between the intermediate router and first and second output routers in order to set up pseudo-wires by the method of an embodiment of the invention;

FIG. 5 represents diagrammatically routing and switching tables of an intermediate router of an embodiment of the invention;

FIGS. 6A, 6B, and 6C represent set-up messages used in the setting-up method of an embodiment of the invention;

DETAILED DESCRIPTION OF ILLUSTRATIVE EMBODIMENTS

Figure 1:
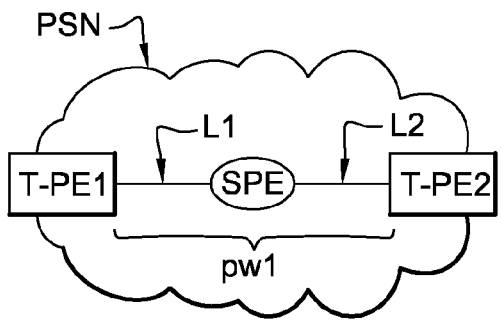
FIG. 1 represents a pseudo-wire set up as in the prior art between an input router and an output router of a packet-switched network.
Figure 2:
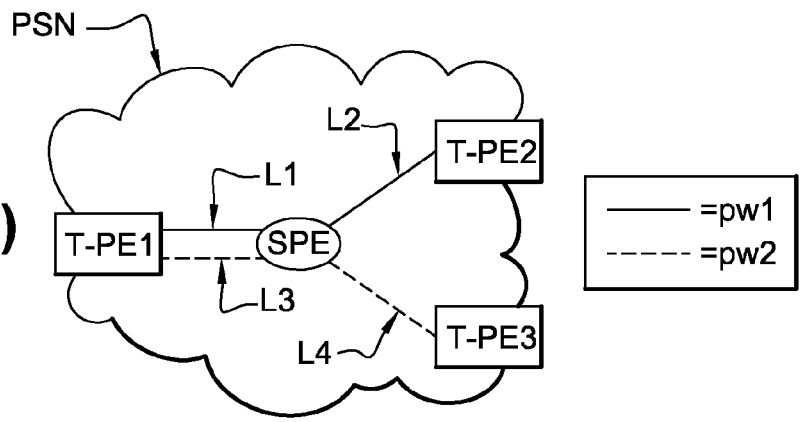
FIG. 2 represents a solution implemented in the prior art to ensure continuity of service in a packet-switched network.
Figure 3:
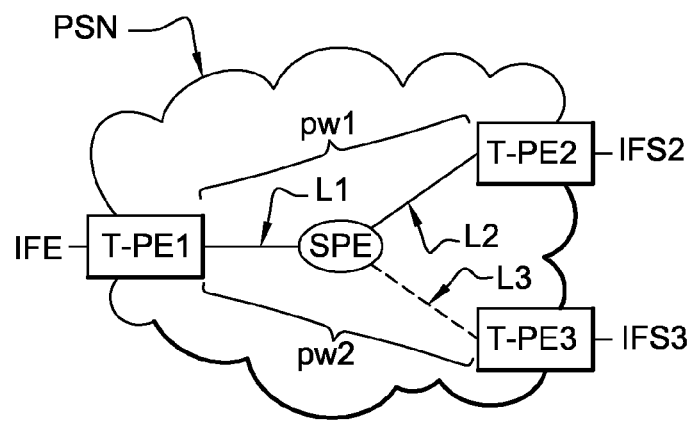
FIG. 3 represents two pseudo-wires set up by the method of an embodiment of the invention.

FIG. 3 represents a connection set up between an input router T-PE1 and two output routers T-PE2 and T-PE3, each of these three routers being at the edge of a packet-switched network PSN.

Referring to this figure, a first link L1 is set up between the input router T-PE1 and an intermediate router S-PE of the network PSN. A second link L2 is set up between the intermediate router S-PE and the first output router T-PE2. The first and second links constitute a first pseudo-wire pw1 setting up a connection between the input router T-PE1 and the first output router T-PE2. The pseudo-wire pw1 set up in this way is used to broadcast data streams divided into packets between the input router T-PE1 and the first output router T-PE2.

A second pseudo-wire pw2 is set up between the input router T-PE1 and the second output router T-PE3. The pseudo-wire pw2 consists of the first link L1 and a second link L3 set up between the intermediate router S-PE and the second output router T-PE3.

Accordingly, the first link L1 is shared by the two pseudo-wires pw1 and pw2. This optimizes the use of network resources, such as bandwidth, between the input router T-PE1 and the intermediate router S-PE, as only one link is set up between these two routers.

One example of application of an embodiment of the invention is collecting traffic for a mobile network. In this kind of example, the input router T-PE1 is connected to a first equipment such as a base station (not represented in the figures), for which it sends data to other aggregation equipments such as a radio network controller RNC connected to the output routers T-PE2 and T-PE3.

FIG. 4 is a timing diagram of the exchange of messages between the input router T-PE1, the intermediate router S-PE, and the output routers T-PE2 and T-PE3 when setting up the pseudo-wires pw1 and pw2.

According to an embodiment of the invention, the pseudo-wires pw1 and pw2 are set up at the initiative of the input router T-PE1 and setting them up is based on the exchange of set-up messages conforming to the label distribution protocol (LDP) as defined in the documents RFC 3036 and RFC 4477. Accordingly, a first set-up message SIG1 is sent by the input router T-PE1 to the intermediate router S-PE. This first set-up message includes an identifier SAII of the input router T-PE1, an identifier of an input interface IFE associated with an equipment connected to the input router, an identifier TAII2 of the first output router T-PE2, an identifier of an output interface IFS2 associated with an equipment connected to the first output router T-PE2, and a field containing an identifier TAII3 of the second output router T-PE3, an identifier of an output interface IFS3 associated with an equipment connected to the first output router T-PE3, and a "backup" parameter specifying that the second pseudo-wire is a back-up pseudo-wire. FIG. 6A shows one such setting up message SIG1.

A forwarding equivalent class (FEC) consists of the pair {identifier SAII of input router T-PE1/associated input interface IFE; identifier TAII2 of first output router T-PE2/associated output interface IFS2}. This information is necessary for setting up a pseudo-wire. The pair consisting of the identifier SAII of the input router T-PE1/associated input interface IFE and the identifier TAII3/associated output interface IFS of the first output router T-PE3 also constitutes an FEC.

The first set-up message SIG1 differs from a standard pseudo-wire set-up message because it includes additional data such as the identifier TAII3 of the second output router T-PE3 and the "backup" parameter indicating the nature of the second pseudo-wire pw2 to be set up.

The set-up message SIG1 also includes a label lb11 associated with the first link L1. This label is used by the input router T-PE1 and the intermediate router S-PE when broadcasting data streams. It is added by the input router T-PE1 to each packet of data to be sent to the first output router T-PE2.

Referring to FIG. 5, on reception of the first set-up message SIG1, the intermediate router S-PE extracts the identifier of the input router T-PE1, the identifier of the first output router T-PE2, and the information contained in the additional field of the message SIG1, namely the identifier of the second output router T-PE3 and the "backup" parameter.

The intermediate router S-PE uses this information to fill in a switching table TC. This switching table TC includes for a given FEC information indicating the label that must be inserted into the header of the message in order to perform the next hop and the output interface if2, if3 to which to direct the data streams. The "backup" parameter indicating the nature of the second pseudo-wire pw2 is also entered into the switching table TC.

Once the switching table TC has been filled in, the intermediate router sends two set-up messages SIG2 and SIG3. The set-up message SIG2 is sent to the first output router T-PE2 and the set-up message SIG3 is sent to the second output router T-PE3.

The message SIG2 includes the identifier SAII of the input router T-PE1, the identifier of an input interface IFE associated with an equipment connected to the input router, the identifier TAII2 of the first output router T-PE2, the identifier of an output interfere IFS2 associated with an equipment connected to the first output router T-PE2, and the label lb12 associated with the link L2 and used when broadcasting data. FIG. 6B shows a message of this kind.

The message SIG3 includes the identifier SAII of the input router T-PE1, the identifier of an input interface IFE associated with an equipment connected to the input router, the identifier TAII3 of the second output router T-PE3, the identifier of an output interface IFS3 associated with an equipment connected to the second output router T-PE3, and the label lb13 associated with the link L3 and used when broadcasting data. FIG. 6C shows a message of this kind.

Once the pseudo-wires pw1 and pw2 have been set up, data streams are broadcast between the input router T-PE1 and the first output router T-PE2.

On reception of a data packet sent by the input router T-PE1, the intermediate router S-PE uses the label added to the packet by the input router to determine to which output interface if2, if3 to direct the data packet, as a function of the information contained in the switching table TC. The packets sent to the first output router T-PE2 are directed to the interface if2 of the intermediate router S-PE. This interface if2 constitutes a first end of the link L2. Before the data packet is sent to the first output router T-PE2, the new label 1b2 is added to the packet.

Figure 7:
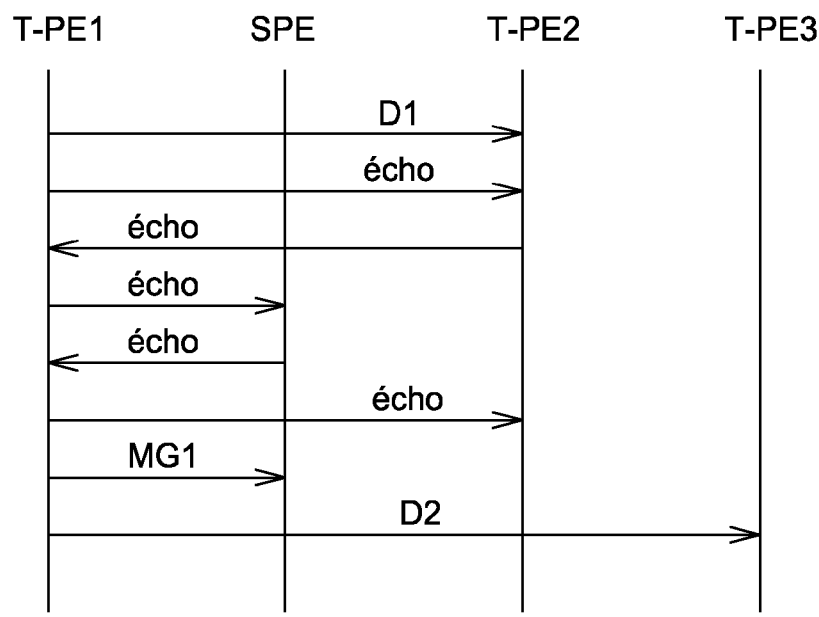
FIG. 7 is a timing diagram of the exchange of messages in a first embodiment of the invention firstly between an input router and an intermediate router of a packet-switched network and secondly between the input router and first and second output routers when broadcasting data on pseudo-wires set up in the packet-switched network.

FIG. 7 represents a timing diagram of the exchange of messages between the input router T-PE1, the intermediate router S-PE, the first output router T-PE2, and the second output router T-PE3 when broadcasting data streams in a first embodiment of the invention.

A data stream D1 is sent by the input router T-PE1 to the first output router T-PE2. This first data stream is broadcast over the network PSN by means of the first pseudo-wire pw1.

To ensure continuity of service, the input router T-PE1 includes a function for detecting a fault affecting the first output router T-PE2. In order to detect this kind of fault, the input router T-PE1 regularly exchanges "echo" messages with the first output router T-PE2 and with the intermediate router S-PE.

If the input router does not receive a response to an "echo" message, it deduces that the first output router T-PE2 or the intermediate router S-PE is faulty.

If the faulty router is the first output router T-PE1, it then sends the intermediate router S-PE a switching message MG1. On reception of this message, the intermediate router S-PE switches the data streams to the link L3.

A data stream D2 sent by the input router T-PE1 following detection of a fault affecting the first output router T-PE2 is then broadcast by the second pseudo-wire pw2 and received by the second output router T-PE3.

Figure 8:
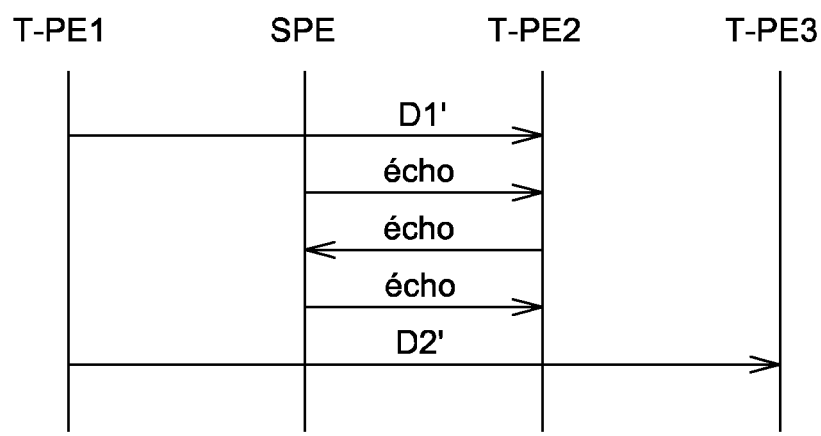
FIG. 8 is a timing diagram of the exchange of messages in a second embodiment of the invention firstly between an input router and an intermediate router of a packet-switched network and secondly between the input router and first and second output routers when broadcasting data on pseudo-wires set up in the packet-switched network.

FIG. 8 is a timing diagram of the exchange of messages between the input router T-PE1, the intermediate router S-PE, the first output router T-PE2, and the second output router T-PE3 when broadcasting data streams in a second embodiment of the invention.

A data stream D1' is sent by the input router T-PE1 to the first output router T-PE2. This data stream is broadcast over the network PSN by the first pseudo-wire pw1.

To ensure continuity of service, the intermediate router S-PE includes a function for detecting a fault affecting the first output router T-PE2. In order to detect such a fault, the intermediate router S-PE regularly exchanges "echo" messages with the first output router T-PE2.

If the intermediate router does not receive a response to its "echo" message, it deduces that the first output router T-PE2 is faulty. It then switches the data streams coming from the input router T-PE1 to the link L3 and advises the input router T-PE1 of this.

Thus a data stream D2' sent by the input router T-PE1 after detection of the fault affecting the first output router is then broadcast by the second pseudo-wire pw2 and received by the second output router T-PE3.

Figure 9:
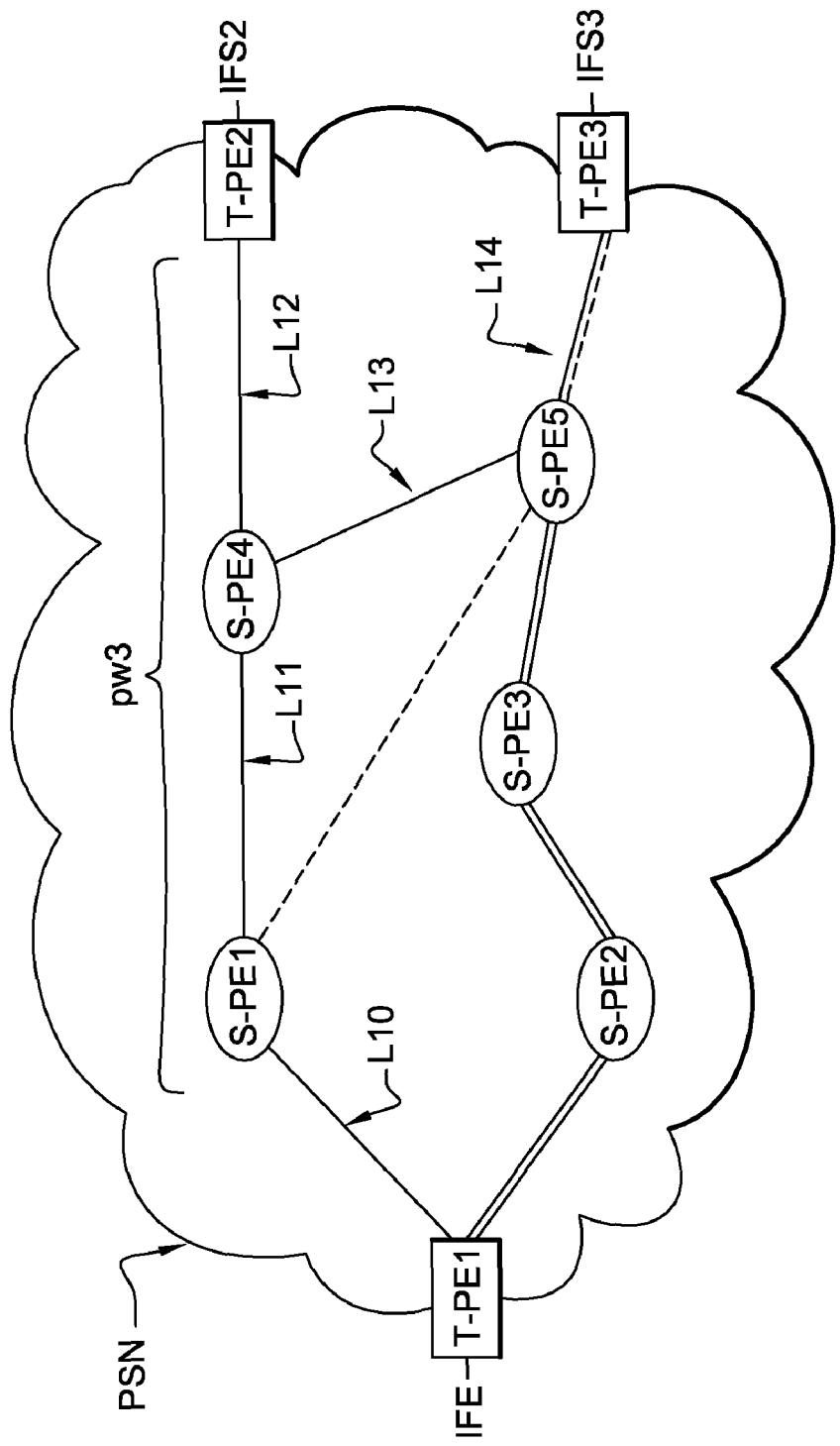
FIG. 9 shows two pseudo-wires set up by a method conforming to a third embodiment of the invention.

FIG. 9 represents a packet-switched communications network PNS comprising a plurality of edge routers T-PE1, T-PE2, and T-PE3 and a plurality of intermediate routers S-PE1 to S-PE5. In such a network, a connection is set up between an input router T-PE1 and first and second output routers T-PE2 and T-PE3, each of these three routers being at the edge of a packet-switched network PSN.

Referring to this figure, a first link L10 is set up between the input router T-PE1 and a first intermediate router S-PE1 of the PSN. A second link L11 is set up between the first intermediate router S-PE1 and a second intermediate router S-PE4. A third link L12 is set up between the second intermediate router S-PE4 and the first output router T-PE2. The first connection 10, the second connection 11, and the third connection 12 constitute a first pseudo-wire pw3, referred to as the main pseudo-wire, setting up a connection between the input router T-PE1 and the first output router T-PE2. The pseudo-wire pw3 set up in this way is used to broadcast data streams divided into packets between the input router T-PE1 and the first output router T-PE2.

A second pseudo-wire pw4, called the back-up pseudo-wire, is set up between the input router T-PE1 and the second output router T-PE3. The pseudo-wire pw4 consists of the first link L10, the second link L11, and a third link L13 set up between a third intermediate router S-PE5 and the second output router T-PE3.

Accordingly, the link L10 and the link L11 are shared by the two pseudo-wires pw3 and pw4. This optimizes use of network resources, such as bandwidth, between the input router T-PE1 and the second intermediate router S-PE4.

Figures 10, 11A, 11B, 11C:
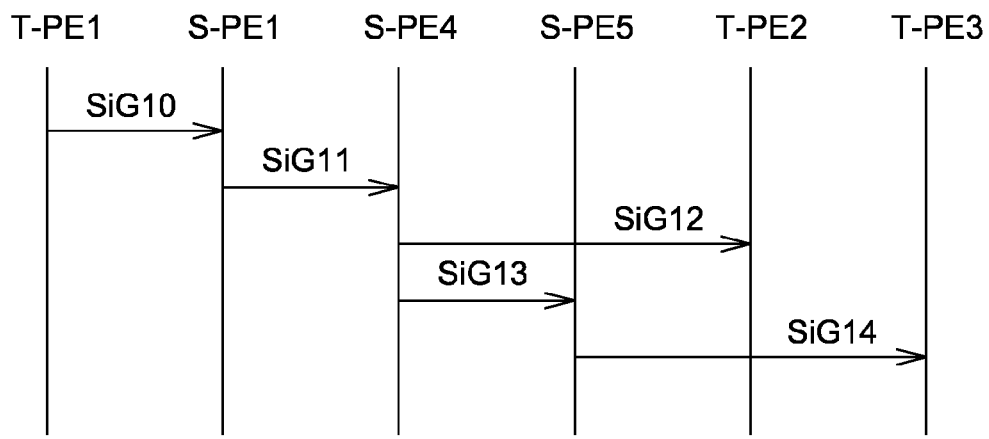
FIG. 10 is a timing diagram of the exchange of requests firstly between a first edge router and intermediate routers of a packet-switched network and secondly between the intermediate routers and second and third edge routers in order to set up pseudo-wires by the method conforming to the third embodiment of the invention.
FIGS. 11A, 11B, 11C represent set-up messages used in the method conforming to the third embodiment of the invention.

FIG. 10 represents a timing diagram for the exchange of messages between the input router T-PE1, the first, second, and third intermediate routers S-PE1, S-PE4, and S-PE5, and the first and second output routers T-PE2 and T-PE3 when setting up the pseudo-wires pw3 and pw4.

According to an embodiment of the invention, the pseudo-wires pw3 and pw4 are set up at the initiative of the input router T-PE1 and setting them up relies on the exchange of LDP set-up messages. Thus a first set-up message SIG10 is sent by the input router T-PE1 to the first intermediate router S-PE1. This first set-up message includes an identifier SAII of the input router T-PE1, an identifier of an input interface IFE associated with an equipment connected to the input router, an identifier TAII2 of the first output router T-PE2, an identifier of an output interface IFS2 associated with an equipment connected to the first output router T-PE2, and a field containing an identifier TAII3 of the second output router T-PE3, an identifier of an output interface IFS3 associated with an equipment connected to the second output router T-PE3, a "backup" parameter specifying that the second pseudo-wire pw4 is a back-up pseudo-wire, and an identifier of an intermediate router S-PE4 handling switching from the first pseudo-wire pw3 to the second pseudo-wire pw4 in the event of a fault affecting the third link L12 that is part of the pseudo-wire pw3. FIG. 11A represents one such-set up message SIG10.

The set-up message SIG10 can contain a plurality of identifiers of output routers to be reached in the event of a fault affecting a link of the first pseudo-wire pw3. Such a message contains as many "backup" parameters as there are output routers to be reached and therefore as there are back-up pseudo-wires to be set up.

A set-up message SIG10 can also contain an additional field containing an explicit list of intermediate routers between which the links of the first pseudo-wire pw3 must be set up.

The set-up message SIG10 also contains a label lb110. This label is used by the input router T-PE1 and the first intermediate router S-PE1 when broadcasting data streams from the intermediate router S-PE1 to the input router T-PE1. It is added by the first intermediate router S-PE1 to each data packet to be sent to the input router T-PE1

On reception of the first set-up message SIG10, the intermediate router S-PE1 extracts the identifier of the input router T-PE1, the identifier of the first output router T-PE2, and where appropriate the explicit list of intermediate routers between which the links of the first pseudo-wire pw3 must be set up.

The first intermediate router S-PE1 uses this information to fill out an intermediate table. This intermediate table contains for a given FEC information indicating the label that must be inserted into the header of the message in order to perform the next hop and the output interface to which to direct the data streams.

Once the switching table has been filled out, the first intermediate router sends a second set-up message SIG11 to the second intermediate router S-PE4.

The hop that the set-up message SIG11 must perform to reach the second intermediate router S-PE4 is determined by the routing information contained in the switching table TC of the intermediate router S-PE1

The set-up message SIG10 can optionally also contain this kind of additional field for each back-up pseudo-wire to be set up, thus specifying the intermediate routers between which the links of the pseudo-wires are set up.

The message SIG11 is identical to the message SIG10; the label lb112 to be used when broadcasting data is the only thing that differs between the two messages.

The information relating to the back-up pseudo-wire pw4, such as the identifier of the intermediate router to effect switching from the first pseudo-wire pw3 to the back-up pseudo-wire pw4, is sent from one intermediate router to another until it reaches the intermediate router that is to effect the switching.

On reception of this set-up message SIG11, the intermediate router S-PE4 extracts the identifier of the input router T-PE1, the identifier of the first output router T-PE2, and where appropriate the explicit list of intermediate routers between which the links of the first pseudo-wire pw3 must be set up. The "backup" parameter indicating the nature of the second pseudo-wire pw4 is also entered into the switching table.

Once the switching table of the intermediate router S-PE4 has been filled out, said router sends two set-up messages SIG12 and SIG13 to the first output router T-PE2 and the third intermediate router S-PE5, respectively.

The message SIG12 contains the identifier SA11 of the input router T-PE1, the identifier of an input interface IFE associated with an equipment connected to the input router, the identifier TA112 of the first output router T-PE2, the identifier of an output interface IFS2 associated with an equipment connected to the first output router T-PE2, and the label lb112 to be associated with the link L12 and used when broadcasting data. FIG. 11B represents such a message.

The message SIG13 contains the identifier SAII of the input router T-PE1, the identifier of an input interface IFE associated with an equipment connected to the input router, the identifier TAII3, the identifier of an output interface IFS3 associated with an equipment connected to the second output router T-PE3, and the label lb113 associated with the link L13 to be set up and used when broadcasting data. FIG. 11C shows such a message. Such a message can contain an explicit list of intermediate routers between which the links of the second pseudo-wire pw4 must be set up to connect the intermediate router S-PE4 to the second output router T-PE3.

Once the pseudo-wires pw3 and pw4 have been set up, the data streams are broadcast between the input router T-PE1 and the first output router T-PE2.

On reception of a data packet sent by the input router T-PE1, the first intermediate router S-PE1 uses the label added to the packet by the router T-PE1 to determine to which output interface if2, if3 to direct the data packet, as a function of the information contained in the switching table TC. The packets sent to the first output router T-PE2 are directed to the interface if2 of the first intermediate router S-PE1. This interface if2 constitutes a first end of the link L10. Before the data packet is sent to the second intermediate router S-PE4, the new label lb11 is added to the data packet.

Figure 12:
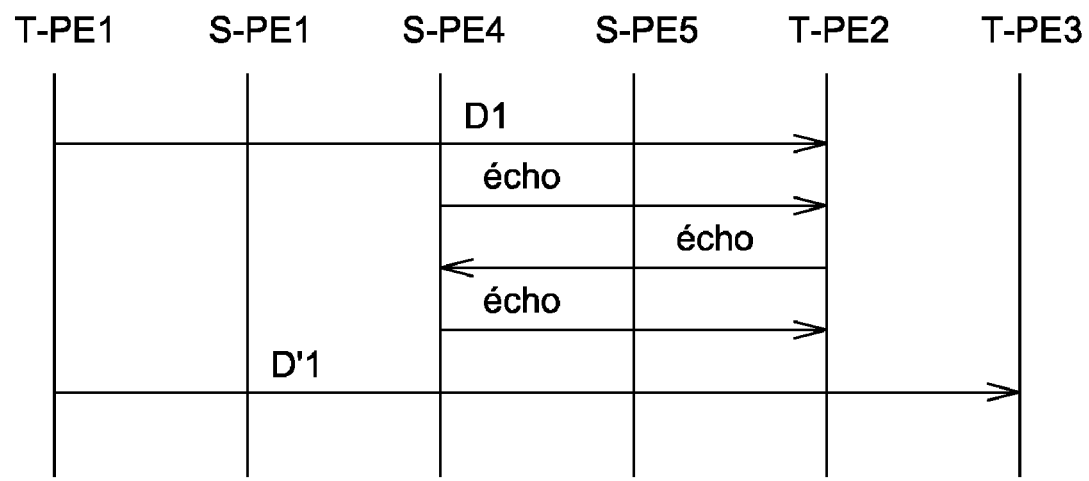
FIG. 12 is a timing diagram of the exchange of messages firstly between an edge router and an intermediate router of a packet-switched network and secondly between the intermediate router and second and third edge routers when broadcasting data on pseudo-wires set up in the packet-switched network in accordance with the third embodiment of the invention.

FIG. 12 is a timing diagram of the exchange of messages between the input router T-PE1, the first intermediate router S-PE1, the second intermediate router S-PE4, the third intermediate router S-PE5, the first output router T-PE2, and the second output router T-PE3 when broadcasting data streams.

A data stream D1 is sent by the input router T-PE1 to the first output router T-PE2. This data stream is broadcast over the network PSN by means of the first pseudo-wire pw3.

To ensure continuity of service, the intermediate router S-PE4 includes a function for detecting a fault affecting the first output router T-PE2. To detect such a fault, the intermediate router S-PE4 regularly exchanges "echo" messages with the first output router T-PE2.

If the input router does not receive a response to its "echo" message, it deduces that the first output router T-PE2 is faulty. It then switches the data streams coming from the input router T-PE1 onto the link L12 and advises the input router T-PE1 of this.

Accordingly, a data stream D'1 sent by the input router T-PE1 following detection of the a fault affecting the first output router T-PE2 is then broadcast by the second pseudo-wire pw4 and received by the second output router T-PE3.

An embodiment of the invention also protects the network from a fault affecting one of the links of the first pseudo-wire pw3 or one of the intermediate routers of the network PSN.

For example, when setting up the first pseudo-wire pw3, the set-up message SIG10 contains, in addition to the information necessary for setting up the back-up pseudo-wire pw4, such as the identifier TAII3 of the second output router T-PE3, the "backup" parameter, and the identifier of the intermediate router S-PE4, additional information necessary for setting up a third or back-up pseudo-wire pw5 (represented in dashed line in FIG. 9).

This information consists of the identifier TAII3 of the second output router T-PE3, the identifier of an output interface IFS3 associated with an equipment connected to the second output router T-PE3, a "backup" parameter specifying that the third pseudo-wire pw5 is a back-up pseudo-wire, and an identifier of an intermediate router S-PE5 effecting switching from the first pseudo-wire pw3 to the third pseudo-wire pw5 in the event of a fault affecting the second link L11 of the pseudo-wire pw3 or the intermediate router S-PE4.

Accordingly, if the intermediate router S-PE1 detects a fault affecting the link L11 or the intermediate router S-PE4, it advises the input router T-PE1 of this and switches the data stream to be broadcast to the third pseudo-wire pw5.

Finally, an embodiment of the invention further includes a computer program, notably a computer program on or in an information medium or memory, adapted to implement an embodiment of the invention. This program can use any programming language and take the form of source code, object code or a code intermediate between source code and object code, such as a partially-compiled form, or any other desirable form for implementing a method of an embodiment of the invention.

The information medium can be any entity or device capable of storing the program. For example, the medium can include storage means, such as a ROM, for example a CD ROM or a micro-electronic circuit ROM, or magnetic storage means, for example a floppy disk or a hard disk.

Moreover, the information medium can be a transmissible medium such as an electrical or optical signal, which can be routed via an electrical or optical cable, by radio or by other means. The program of an embodiment of the invention can in particular be downloaded over an Internet-type network.

Although the present disclosure has been described with reference to one or more examples, workers skilled in the art will recognize that changes may be made in form and detail without departing from the scope of the disclosure and/or the appended claims.

The invention claimed is:

1. A method of setting up at least two pseudo-wires able to broadcast a data stream, comprising:
setting up a first pseudo-wire comprising a first link set up between an input router of a packet-switched network and an intermediate router of the packet-switched network and a second link set up between said intermediate router and a first output router of the packet-switched network; and
setting up a second pseudo-wire between said input router and a second output router of the packet-switched network, wherein the second pseudo-wire comprises said first link and a third link set up between said intermediate router and said second output router, said first link being shared by the first and second pseudo-wires.

2. The method according to claim 1, wherein the steps of setting up the first and second pseudo-wires are performed at the initiative of said input router by sending said intermediate router a message for setting-up said third link including an identifier of said input router, an identifier of said first output router, and a field containing an identifier of said second output router and a parameter specifying that the second pseudo-wire is a back-up pseudo-wire.

3. A method of broadcasting a data streams over a first pseudo-wire comprising a first link set up between an input router of a packet-switched network and an intermediate router of said packet-switched network and a second link set up between said intermediate router and a first output router of said packet-switched network, said method comprising:
a step of detecting a fault affecting the first output router; and
on reception of information on a fault affecting said first output router, a step of switching the data stream to a second pseudo-wire comprising said first link and a third link set up between said intermediate router and a second output router of said packet-switched network, said first link being shared by the first and second pseudo-wires.

4. An intermediate router configured to be connected by a first link to an input router of a packet-switched network and by a second link to a first output router of said packet-switched network, said first and second links constituting a first pseudo-wire able to broadcast a data stream, the intermediate router comprising:
means for receiving a first message for setting up the first link including an identifier of said input router, an identifier of said first output router, and a field containing an identifier of a second output router of said network;
means for sending a second message for setting up said second link between said intermediate router and said first output router and a third message for setting up a third link between said intermediate router and said second output router, the second message including the identifier of said input router and the identifier of said first output router, the third message including the identifier of said input router and the identifier of said second output router, and said first and third links constituting a second pseudo-wire;

means for configuring at least one switching table for said broadcasting with a parameter specifying that the second pseudo-wire is a back-up pseudo-wire, said parameter being included in the first set-up message.

5. The intermediate router according to claim 4, wherein the intermediate router includes means for detecting a fault affecting said first output router and means for switching the stream of data from the second link to the third link.

6. A computer program product stored on a non-transitory computer-readable medium and comprising program code instructions for implementing a method of setting up at least two pseudo-wires able to broadcast a data stream when said program is executed by a computer, the program code instructions comprising instructions for:

setting up a first pseudo-wire comprising a first link set up between an input router of a packet-switched network and an intermediate router of the packet-switched network and a second link set up between said intermediate router and a first output router of the packet-switched network; and setting up a second pseudo-wire between said input router and a second output router of the packet-switched network, wherein the second pseudo-wire comprises said first link and a third link set up between said intermediate router and said second output router, said first link being shared by the first and second pseudo-wires.

7. A computer program product stored on a non-transitory computer-readable medium and comprising program code instructions for implementing a method of broadcasting a data streams over a first pseudo-wire when said program is executed by a computer, wherein the first pseudo-wire comprises a first link set up between an input router of a packet-switched network and an intermediate router of said packet-switched network and a second link set up between said intermediate router and a first output router of said packet-switched network, the program code instructions comprising instructions for:

detecting a fault affecting the first output router; and on reception of information on a fault affecting said first output router, switching the data stream to a second pseudo-wire comprising said first link and a third link set up between said intermediate router and a second output router of said packet-switched network, said first link being shared by the first and second pseudo-wires.

8. A method comprising:

generating a signal configured to be transmitted between an input router of a packet-switched network and an intermediate router of said packet-switched network, said signal carrying a message for setting up at least two pseudo-wires able to broadcast a stream of data, a first pseudo-wire being set up between said input router and a first output router of said packet-switched network, a second pseudo-wire being set up between said input router and a second output router of said packet-switched network, said set-up message including:

an identifier of said input router;

an identifier of said first output router; and a field containing an identifier of said second output router and a parameter specifying that the second pseudo-wire is a back-up pseudo-wire; and transmitting the signal between the input router of the packet-switched network and the intermediate router of said packet-switched network.

9. The method according to claim 8, wherein the field further contains an identifier of said intermediate router.

* * * * *